(12) United States Patent
de Haas

(10) Patent No.: US 11,586,568 B2
(45) Date of Patent: Feb. 21, 2023

(54) CONTROLLER AND TRANSCEIVER

(71) Applicant: NXP B.V., Eindhoven (NL)

(72) Inventor: Clemens Gerhardus Johannes de Haas, Ewijk (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/302,732

(22) Filed: May 11, 2021

(65) Prior Publication Data

US 2021/0374083 A1 Dec. 2, 2021

(30) Foreign Application Priority Data

May 26, 2020 (EP) ..................................... 20176592

(51) Int. Cl.
*G06F 13/20* (2006.01)
*H04L 12/40* (2006.01)

(52) U.S. Cl.
CPC .............. *G06F 13/20* (2013.01); *H04L 12/40* (2013.01); *H04L 2012/40215* (2013.01)

(58) Field of Classification Search
CPC .... H04W 76/02; H04W 28/02; H04W 76/026
See application file for complete search history.

(56) References Cited

U.S. PATENT DOCUMENTS 10,470,279 B1 * 11/2019 Fultz ..................... H05B 47/19
10,824,583 B2    11/2020 Muth et al.

2016/0234876 A1 * 8/2016 Burra ..................... H04W 36/14
2017/0058693 A1 * 3/2017 Epstein ..................... F02C 7/00
2018/0375550 A1 * 12/2018 Zhou ..................... H04B 7/0686

(Continued)

FOREIGN PATENT DOCUMENTS

DE   10 2005 057 309 A1   6/2007
WO       2018/189046 A1   10/2018

OTHER PUBLICATIONS

Horst, C. "Can XL Next Step in Can Evolution—Background & Target", Bosch, 13 pgs. retreived from the internet at: https://www.bosch-semiconductors.com/media/ip_modules/pdf_2/can_xl_1/canxl_intro20200529.pdf (May 26, 2020).

(Continued)

*Primary Examiner* — Getente A Yimer

(57) ABSTRACT

The disclosure relates to a controller and a transceiver and associated software and methods. A controller for communicating with a transceiver in a network node having a first mode of operation and a second mode of operation, the controller comprising: a first-data-terminal for communicating with the transceiver; and a second-data-terminal for communicating with the transceiver, in which the controller is configured to: in the second mode, determine receive-data based on a first-data-signal at the first-data-terminal and a second-data-signal at the second-data-terminal; determine that a change of mode from the second mode to the first mode is required; and in response to determining that a change of mode from the second mode to the first mode is required, provide a controller-mode-signal that instructs the transceiver to operate in the first mode rather than the second mode, wherein the controller-mode-signal is provided by simultaneously driving a first current on the first-data-terminal and a second current on the second-data-terminal.

17 Claims, 9 Drawing Sheets

(56) References Cited

U.S. PATENT DOCUMENTS

2019/0068366 A1* 2/2019 Guajardo Merchan ...................... H04L 9/0869

OTHER PUBLICATIONS

U.S. Appl. No. 17/248,226, filed on Jan. 14, 2021, entitled: Controller Area Network Controller and Transceiver. The Examiner is referred to the copending patent prosecution of the common Applicant (no attachment).
U.S. Appl. No. 17/302,730, filed on May 11, 2021, entitled: Controller Area Network Controller and Transceiver. The Examiner is referred to the copending patent prosecution of the common Applicant (no attachment).

* cited by examiner

CONTROLLER AND TRANSCEIVER

CROSS-REFERENCE TO RELATED APPLICATIONS

This application claims the priority under 35 U.S.C. § 119 of European patent application no. 20176592.2, filed on May 26, 2020, the contents of which are incorporated by reference herein.

TECHNICAL FIELD

The present disclosure relates to a transceiver and a controller for a network node, a network containing the node and associated methods of operation and corresponding computer programs. In particular, although not exclusively, the present disclosure relates to a CAN transceiver, a CAN controller, a CAN device, a CAN network and associated methods of operation.

BACKGROUND

In-vehicle network (IVN) busses, such as CAN (Controller Area Network), CAN FD (CAN with Flexible Data-Rate), LIN (Local Interconnect Network), FlexRay, Ethernet based network busses, and other types, can be used for communications within vehicles. For example, controller area network (CAN) bus is a message-based communications bus protocol that is often used within automobiles. A CAN bus network may include multiple bus devices, so called nodes or electronic control units (ECUs), such as an engine control module (ECM), a power train control module (PCM), airbags, antilock brakes, cruise control, electric power steering, audio systems, windows, doors, mirror adjustment, battery and recharging systems for hybrid/electric cars, and many more. The CAN bus protocol is used to enable communications between the various bus devices. The data link layer of the CAN protocol is standardized as International Standards Organization (ISO) 11898-1:2003. CAN Flexible Data-Rate or "CAN FD," which is an extension of the standardized CAN data link layer protocol and is meanwhile integrated into the ISO11898-2:2016 standard, can provide higher data rates. But the standardized CAN data link layer protocol is still in further process of being extended to provide even higher data rates. A further extension, referred to as CAN XL, with a new level scheme allowing even higher data rates is in the definition phase discussed under CiA610 (CAN in Automation), is discussed in draft specification CiA610-1, and is moving towards standardization in the form of either a further update of the existing ISO11898 standards or a new standard.

SUMMARY

According to a first aspect there is provided a controller for communicating with a transceiver in a network node having a first mode of operation and a second mode of operation, the controller comprising:
a first-data-terminal for communicating with the transceiver; and
a second-data-terminal for communicating with the transceiver, in which the controller may comprise a processor that is configured to:
in the second mode, determine receive-data based on a first-data-signal at the first-data-terminal and a second-data-signal at the second-data-terminal;
determine that a change of mode from the second mode to the first mode is required; and
in response to determining that a change of mode from the second mode to the first mode is required, provide a controller-mode-signal that instructs the transceiver to operate in the first mode rather than the second mode, wherein the controller-mode-signal is provided by simultaneously driving a first current on the first-data-terminal and a second current on the second-data-terminal.

The receive-data may be encoded as differential signals received at the first-data-terminal and the second-data-terminal of the controller.

The controller may be configured to determine that a change of mode from the second mode to the first mode is required based on the received-data.

According to one example, the controller is configured to provide the controller-mode-signal by driving a first current on the first-data-terminal and a second current on the second-data-terminal. The first and second currents may have the same polarity.

The first and second currents may be in the same direction. That is, both currents may flow into the controller or both currents may flow out of the controller. The first and second currents may be sinking currents. The first and second currents may be sourcing currents.

According to one example, the controller is configured to provide the controller-mode-signal by driving both the first-data-terminal and the second-data-terminal into the same logic state.

The controller may be configured to provide the controller-mode-signal by driving both the first-data-terminal and the second-data-terminal to the same, or substantially the same, voltage level.

According to one example, the controller is configured to provide the controller-mode-signal by driving both the first-data-terminal and the second-data-terminal into the low logic state.

The controller may be configured to provide the controller-mode-signal by driving both the first-data-terminal and the second-data-terminal into the high logic state.

The controller may comprise a first strong driver for driving the first current at the first-data-terminal and a second strong driver for driving the second current at the second-data-terminal.

According to one example, the controller comprises a first strong sinking driver for driving the first current at the first-data-terminal and a second strong sinking driver for driving the second current at the second-data-terminal.

The controller may comprise a first strong sourcing driver for driving the first current at the first-data-terminal. The controller may comprise a second strong sourcing driver for driving the second current at the second-data-terminal.

A strong current may be larger in magnitude than a weak current. The terms weak and strong may be used relative to one another in this context.

The control-mode-signal may have a duration of at least one of 30, 50, 90, 100, 120, 200 ns. The control-mode-signal may have a duration of between 90 ns and 110 ns.

The controller may be further configured to:
in a third mode of operation, provide transmit-data using on a signal at the first-data-terminal and a signal at the second-data-terminal;
in response to determining that a change of mode from the third mode to the first mode is required, provide a controller-mode-signal that instructs the transceiver to operate in the first mode rather than the third mode, wherein the controller-mode-signal is provided by simultaneously driving a first current on the first-data-terminal and a second current on the second-data-terminal.

The transmit-data may be encoded as differential signals provided at the first-data-terminal and the second-data-terminal of the controller.

According to one example, the controller is a CAN controller. The CAN controller may be configured to operate in the first mode in accordance with ISO 11898-1:2003.

A weak current may be in the range of 2 mA to 8 mA. A strong current may be greater than 8 mA.

According to a further aspect there is provided a transceiver for communicating with a controller in a network node and a network bus external to the node having a first mode of operation and a second mode of operation, the transceiver comprising:
   at least one bus terminal for communicating with the network bus;
   a first-data-terminal for communicating with the controller;
   a second-data-terminal for communicating with the controller,
   a receiver configured to, in the second mode, generate receive-data for the controller based on a bus signal received at the at least one bus terminal, in which the receive-data is provided by the transceiver driving a first current on the first-data-terminal and driving an opposing second current to the second-data-terminal;
   in which the transceiver is configured to:
      in the second mode of operation, monitor the first-data-terminal and the second-data-terminal for a controller-mode-signal indicating that a change of mode from the second mode to the first mode is required, in which the controller-mode-signal is provided by a logic level at the first-data-terminal being the same as a logic level at the second-data-terminal; and
      change mode from the second mode to the first mode based on a detection of the controller-mode-signal.

A magnitude of the first current is different to a magnitude of the second current. One of the first and second currents is a weak current and the other is a strong current. One of the first and second currents drives the voltage level towards logic low and the other drives the voltage level towards logic high.

According to one example, the transceiver comprises a first output driver coupled to the first-data-terminal of the transceiver and a second output driver coupled to the second-data-terminal of the transceiver. Each output driver may comprise a weak sourcing driver and a strong sinking driver for providing the respective first and second currents. Alternatively, each output driver may comprise a strong sourcing driver and a weak sinking driver. In general, each output driver may comprise on strong driver and one weak driver.

The current provided by the weak driver may be an opposite current to the current provided by the strong driver.

The receiver of the transceiver may be configured to control the first output driver to provide the first current and to control the second output driver to provide the second current in accordance with the bus signal.

According to one example, the transceiver comprises logic configured to perform an exclusive OR, XOR, or exclusive NOR, XNOR, operation on signals from the first-data-terminal and the second-data-terminal.

The receive-data may be encoded as differential signals received at the first-data-terminal and the second-data-terminal of the controller.

The transceiver may further comprise:
   a transmitter configured to, in a third mode, receive transmit-data for the controller and generate a bus signal for the at least one bus terminal based on the transmit-signal, in which the transmit-data is provided by the controller as a differential signal at the first first-data-terminal and the second-data-terminal;
   in which the transceiver is configured to:
      in the third mode of operation, monitor the first-data-terminal and the second-data-terminal for a controller-mode-signal indicating that a change of mode from the third mode to the first mode is required, in which the controller-mode-signal is provided by a logic level at the first-data-terminal being the same as a logic level at the second-data-terminal; and
      change mode from the third mode to the first mode based on a detection of the controller-mode-signal.

According to one example, the transceiver comprises a transmitter having an input coupled to the first-data-terminal and at least one output connected to the CAN bus terminal. The transmitter may be configured to, in the first mode, convert data received at the first-data-terminal to a differential signal for the CAN bus. The transmitter may comprise a first-data-terminal repeater unit for use in the first mode. The repeater unit may comprise a forward path buffer, which may be provided by a Schmitt trigger, between the first-data-terminal and the transmitter. The repeater unit may comprise a feedback path between the first-data-terminal and the transmitter.

The transmitter may comprise a second-data-terminal repeater unit for use in the first mode The second-data-terminal repeater unit may comprise a forward path buffer between the second-data-terminal and the receiver. The second-data-terminal repeater unit may comprise a feedback path between the second-data-terminal and the receiver. The receiver may comprise an output driver coupled to the second-data-terminal. The output driver may have a maximum active pulse time.

In one example, the output driver is configured to be in high ohmic state after the maximum active pulse time has elapsed.

In one example, the transceiver has a third mode of operation. The transmitter may be configured to, in the third mode, convert data received at the first-data-terminal to a differential signal for the CAN bus using a different conversion scheme to conversion in the first mode. The transceiver may comprise a first-data-terminal repeater unit for use in the third mode. The first-data-terminal repeater unit may comprise a forward path buffer between the first-data-terminal and the transmitter. The first-data-terminal repeater unit may comprise a feedback path between the first-data-terminal and the transmitter. The transceiver may comprise a second-data-terminal repeater unit for use in the third mode. The second-data-terminal repeater unit may comprise a forward path buffer between the second-data-terminal and the receiver. The second-data-terminal repeater unit may comprise a feedback path between the second-data-terminal and the receiver In one example, the transceiver is a CAN transceiver.

The controller and transceiver may be provided in different device packages. The first-data-terminal and second-data-terminal may be provided by pins of the respective device packages.

According to a further aspect, there is provided a node comprising a controller described herein and a transceiver described herein.

According to a further aspect, there is provided a CAN network comprising at least one node described herein may be provided.

According to a further aspect, there is provided a method of operating a controller communicating with a transceiver in a network node having a first mode of operation and a second mode of operation, the method comprising:

in the second mode, determining receive-data based on a signal at a first-data-terminal and a signal at the second-data-terminal of the controller;

determining that a change of mode from the second mode to the first mode is required; and in response to determining that a change of mode from the second mode to the first mode is required, controlling drivers of the controller to drive a first current on the first-data-terminal and a second current on the second-data-terminal to provide a controller-mode-signal that instructs the transceiver to operate in the first mode rather than the second mode.

According to a further aspect, there is provided computer program code configured to cause a processor of a controller to perform the method above.

According to a further aspect, there is provided computer program code configured to cause a processor to perform any method disclosed herein.

According to a further aspect of the present disclosure, computer program code is provided. There may be provided a non-transient computer readable medium comprising the computer program code. Computer program code may be provided that is configured to cause a processor to execute any method disclosed herein.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF FIGURES

One or more embodiments will now be described by way of example only with reference to the accompanying drawings in which:

FIG. 1b shows an example schematic block diagram of a node on the CAN of FIG. 1a;

SPECIFIC DESCRIPTION

The proposed CAN XL framework provides a number of modes, including a SLOW mode, which is backwards compatible with conventional CAN, and, in order to provide an improved data rate, a fast transmit mode (FAST-TX) and a fast receive mode (FAST-RX). Reference to a CAN transceiver or a CAN controller herein may be understood as a controller and transceiver that implements, at least in part, the CAN protocol in full or in part or the CAN FD protocol in full or in part. The functionality described for the CAN transceiver or CAN controller herein may comprise increased functionality above what is currently defined in the CAN protocol.

Figure 1A:
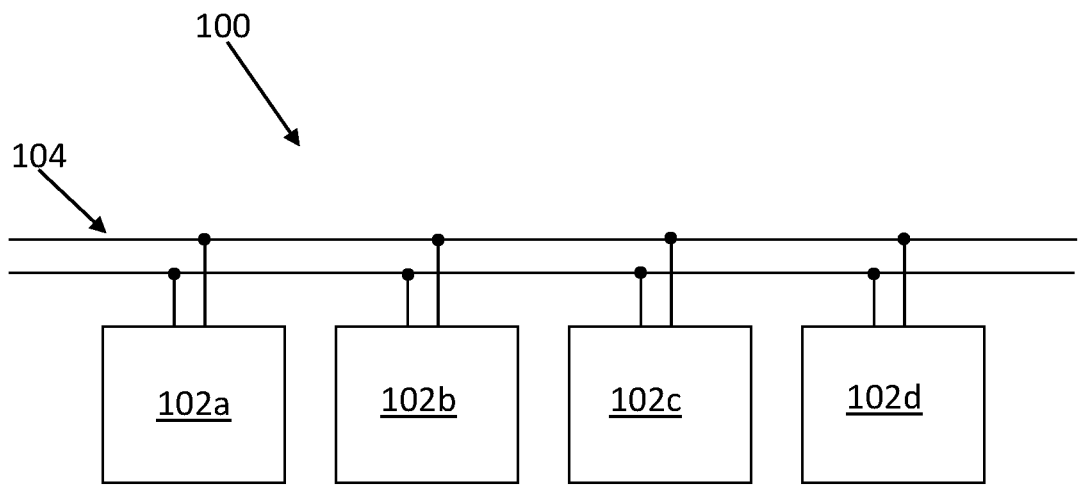
FIG. 1a shows an example schematic block diagram of a controller area network (CAN)

FIG. 1a illustrates an example schematic block diagram of a controller area network (CAN) 100 comprising a plurality of CAN devices, or nodes, 102a-d, which are each coupled to a CAN bus 104. The CAN bus 104 comprises two signal lines for communicating a differential signal between the plurality of CAN devices 102a-d.

Figure 1B:
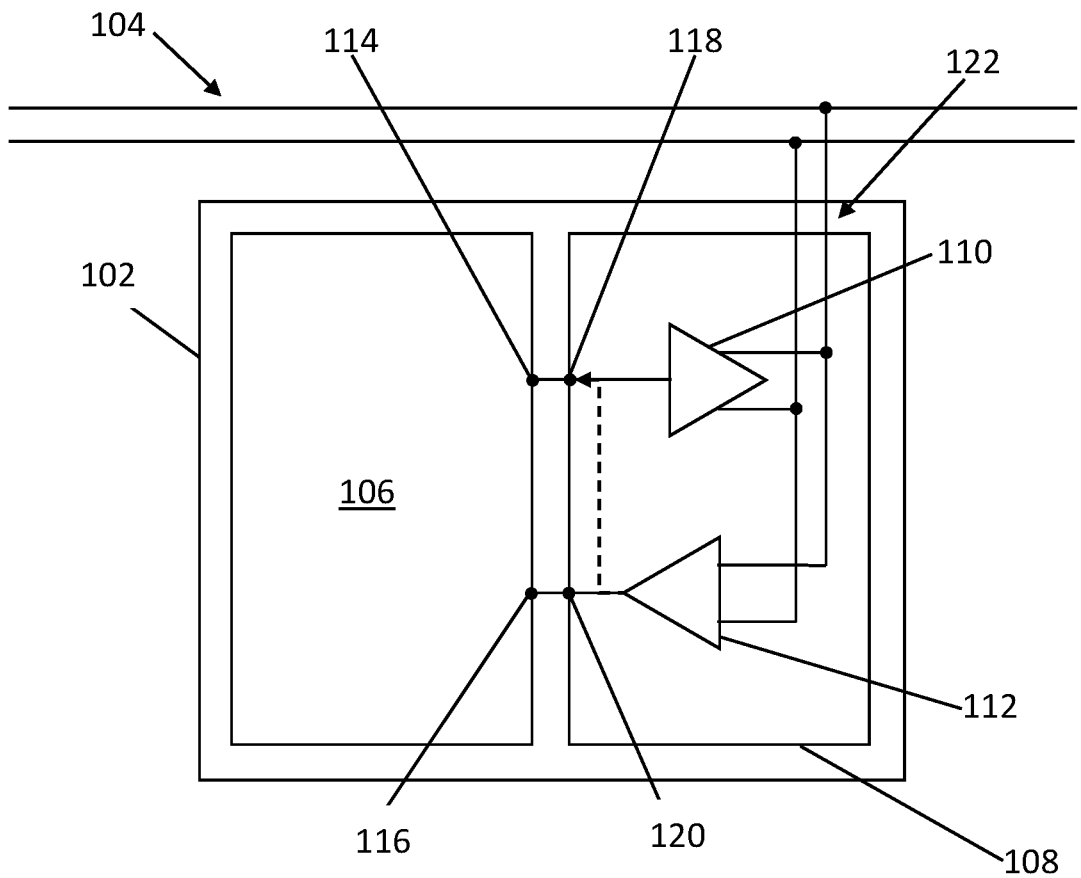

FIG. 1b illustrates a schematic block diagram of a CAN device 102 coupled to the CAN bus 104. The CAN device 102 comprises a CAN controller 106 and a CAN transceiver 108. The CAN controller 106 may be implemented by a processor, such as a microprocessor, configured to implement a CAN protocol of operation within the CAN network 100. The CAN transceiver 108 interfaces the CAN controller 106 with the CAN bus 104. In some examples, the CAN transceiver 108 can operate with no, or limited, circuitry for understanding or implementing the CAN protocol and so may be of relatively limited power consumption compared to the processor of the CAN controller 106.

The CAN controller 106 has a first-data-terminal 114 and a second-data-terminal 116. The CAN transceiver 108 has a first-data-terminal 118, a second-data-terminal 120 and a bus terminal 122, which may also be referred to as a bus port. The bus terminal 122 is coupled to the two signal lines of the CAN bus 104. The transmitter output 114 of the CAN controller 106 is coupled to the first-data-terminal 118 of the CAN transceiver 108. The second-data-terminal 116 of the CAN controller 106 is coupled to the receive output 120 of the CAN transceiver 108.

The CAN transceiver 108 comprises a transmitter unit 110 and a receiver unit 112.

The transmitter unit 110 has an input coupled to the first-data-terminal 118 of the CAN transceiver 108 and outputs connected to the CAN bus terminal 122 of the CAN transceiver 108. The transmitter unit 110 is configured to convert data received at the first-data-terminal 118 of the CAN transceiver 108 to a differential signal for the CAN bus 104.

The transmitter unit 110 comprises at least one transmitter. The at least one transmitter is configured to operate in a first transmission mode or a second transmission mode. In the first transmission mode the transmitter arrangement is configured to transmit said signalling with a first property and in the second transmission mode the transmitter arrangement is configured to transmit said signalling with a second property. The first and second property may comprise one or more property types, such as baud rate (e.g. maximum, minimum or average baud rate), voltage level scheme, encoding scheme or other. However, for ease of explanation herein, the first and second property may comprise baud rate such that the first property comprises a first baud rate and the second property comprises a second baud rate wherein the first baud rate is higher than the second baud rate. The use of a higher baud rate may improve the rate with which data can be transmitted on the CAN bus. Nevertheless, it will be appreciated that the first and second property could (in any of the example embodiments herein) alternatively be, or additionally be, a voltage level scheme used to represent logic 0 and logic 1 on the CAN bus 102.

Therefore, going forward and as an example only, the first transmission mode may be referred to as the fast transmission mode (FAST-TX) and the second transmission mode may be referred to as the slow transmission mode (SLOW-TX).

In FAST-TX mode, the receive-data is provided by the controller driving currents on the first-data-terminal and the second-data-terminal using differential encoding, for example. In SLOW-TX mode, the receive-data is provided by the controller signalling to the transceiver using only the first-data-terminal.

The receiver unit 112 has inputs coupled to the CAN bus terminal 122 and outputs coupled to the first-data-terminal 118 and second-data-terminal 120 of the CAN transceiver 108. The receiver unit 112 is configured to convert a differential signal on the CAN bus 104 into receive-data for the CAN controller 106.

The receiver unit 112 comprises at least one receiver. The at least one receiver may be configured to operate in a first receive mode or a second receive mode, wherein in the first receive mode the receiver unit 112 is configured to receive signalling from the bus 102 with the first property and in the second receive mode the receiver unit 112 is configured to receive signalling from the bus 102 with the second property. As described above, the property may any one or more of baud rate, voltage level scheme, encoding scheme or other.

Therefore, going forward and as an example only, the first receive mode may be referred to as the fast receive mode (FAST-RX) and the second receive mode may be referred to as the slow receive mode (SLOW-RX).

In FAST-RX mode, the receive-data is provided by the transceiver driving a current on one of the first-data-terminal and the second-data-terminal using differential encoding, for example. In SLOW-RX mode, the receive-data is provided by the transceiver signalling using only the second-data-terminal.

The first-data-terminal and the second-data-terminal may therefore be considered to provide bi-directional data transfer in the FAST data modes.

Figure 2:
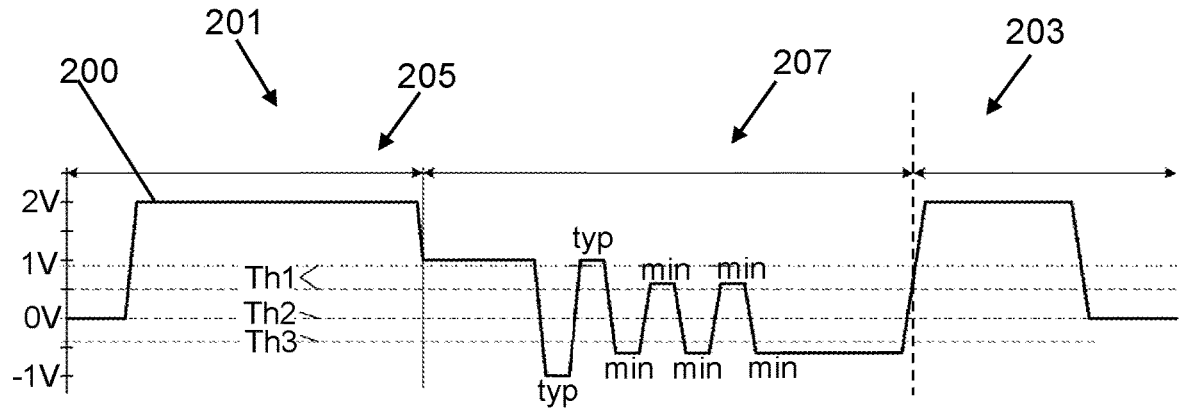
FIG. 2 illustrates an example schematic of a signal on a CAN XL bus.

FIG. 2 illustrates a schematic of a signal 200 on a CAN XL bus for providing relatively high-speed data communication in a CAN network. Two different voltage level schemes in a CAN XL Frame are illustrated. The signal 200 provides a simplified CAN frame 201.

The simplified CAN frame 201 comprises excerpts representing arbitration phases 203, 205 (in SLOW mode) and an excerpt representing a data phase 207 (in FAST mode). The valid signal levels in the arbitration phases 203, 205 may be defined in accordance with ISO 11898-2: 2016. The data phase 207 contains data at CAN XL levels, as discussed further below. In practical examples the data phase 207 may be substantially longer than the arbitration phases 203, 205, and may comprise 2048 data bytes, for example. In particular, the level of the signal in the arbitration phase can be used to indicate whether a particular node gets access to the bus system by the CAN defined arbitration methodology using dominant and recessive bus driver levels and according receiver thresholds.

A CAN XL transceiver will have three different threshold levels to be supported. A first threshold (Th1) is around the well-known ISO11898-2:2016 standard levels between +0.5V and +0.9V differential, used for the backwards compatible CAN arbitration.

The second threshold (Th2) is related to the fast CAN XL data communication around 0V differential, which has a minimum level of −0.1 V and a maximum level of +0.1V.

The third threshold (Th3) is used to reliably detect that there is fast CAN XL data communication on the bus lines through a threshold in the negative differential area, which has a maximum level that is lower than the minimum level of the second threshold (e.g. −0.3V . . . −0.4V).

During the arbitration phase (SLOW), it is decided whether a particular node on the network is to become dominant, and enter FAST-TX mode, or recessive, and enter FAST-RX mode.

Figure 3:
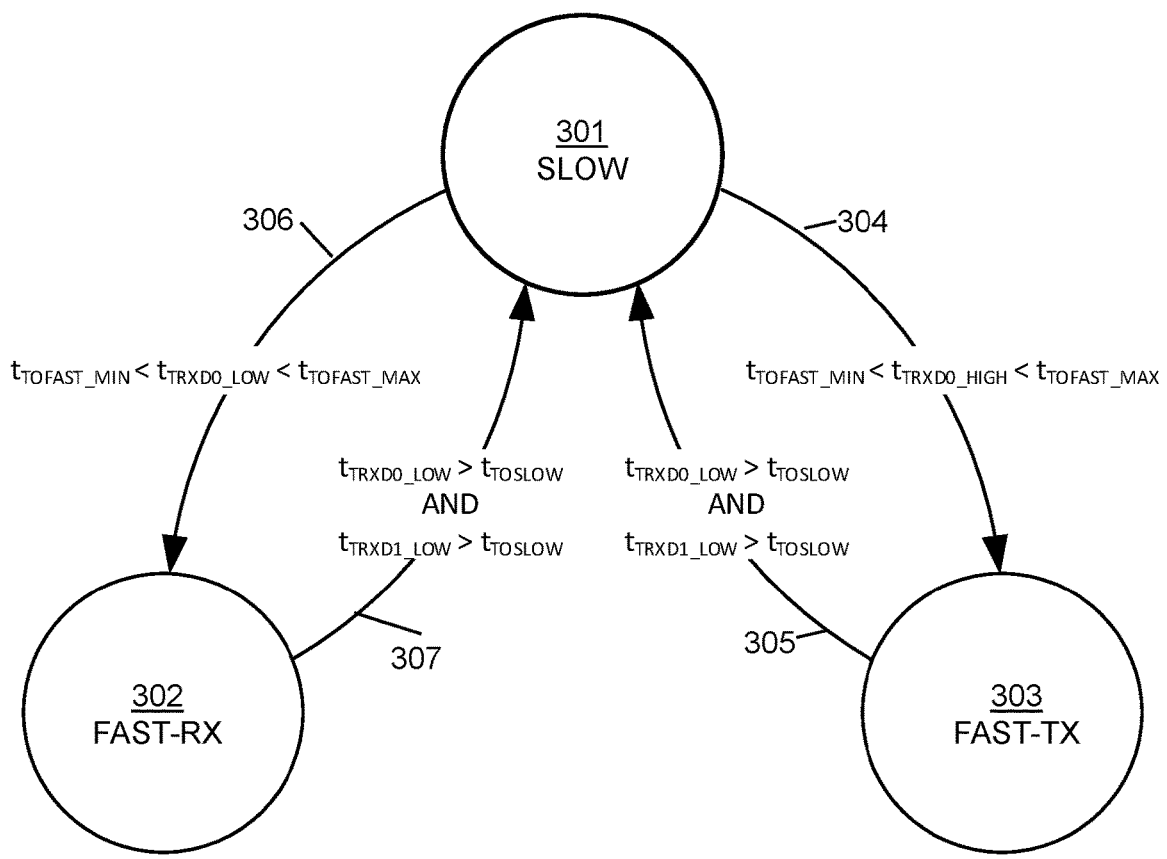
FIG. 3 shows an example state diagram illustrating the modes of a CAN transceiver.

FIG. 3 illustrates a state diagram for the operating modes of a CAN XL node. The controller and transceiver of the node may each be considered to be operating in one of the particular modes. As described previously, the modes include a first mode (SLOW) 301, a second mode (FAST-RX) 302 and a third mode (FAST-TX) 303. A number of transitions between states of the system are allowed in the CAN scheme. In particular, the node may transition 306 from the first mode 301 to the second mode 302. The node may transition 307 from the second mode 302 to the first mode 301. The node may transition 304 from the first mode 301 to the third mode 303. The node may transition 305 from the third mode 303 to the first mode 301. The conditions for the various transitions labelled on FIG. 3 are discussed below following the introduction of the concepts introduced in FIGS. 4 to 10.

In order to ensure proper operation of the CAN network it is necessary for the operational state, or mode, of each of the nodes in the network to be synchronised. For example, as described previously, only one node may operate as the FAST-TX mode on the network at any one time in the data phase and the other nodes on the network should operate in the FAST-RX mode in order to ensure proper communication.

As described previously in relation to FIG. 1, the transceiver needs to modify its operating parameters in the various modes. However, the transceiver is typically implemented in a relatively simplified form in order to reduce costs, complexity, and power consumption and so typically a transceiver is implemented without working protocol knowledge. The transceiver itself therefore may not detect a requirement for a change in operating mode of the node. To address this issue, the controller may monitor data determine that a change in mode is required and then the controller signals the need for the change in mode to the transceiver.

The mode change may be required for a number of reasons, for example, because of:
  i. the scheduled end of a FAST data phase;
  ii. in response to detecting erroneous data in a data-signal, for example because of a collision on the bus; or
  iii. after initialization (example, if a microcontroller of the controller was reset after undervoltage while transceiver was still in FAST mode) to ensure that the transceiver is in SLOW mode before the transmission of a CAN frame starts.

Figure 4:
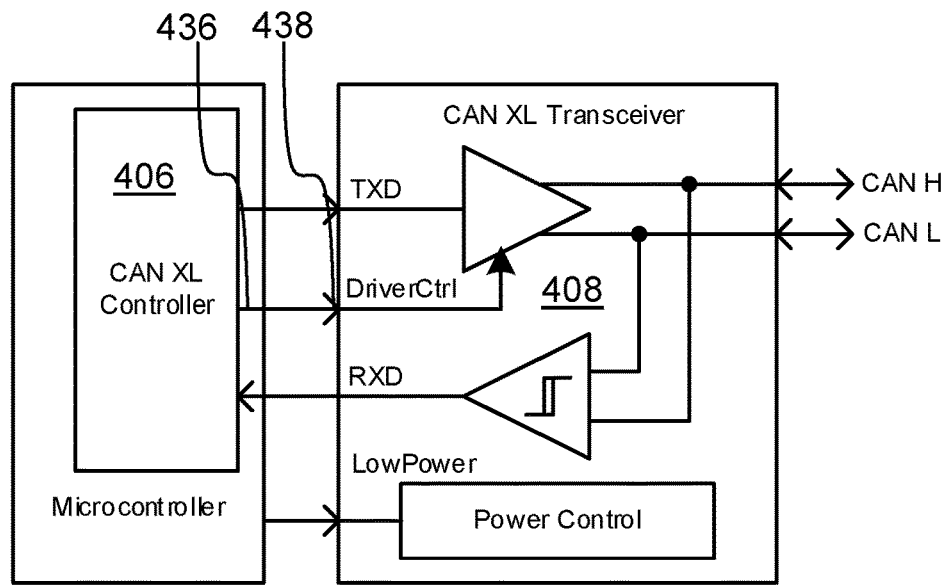
FIG. 4 illustrates a node comprising a controller and a transceiver.

FIG. 4 illustrates a node comprising a controller 406 and a transceiver 408. In this example, the controller 406 and the transceiver 408 are each provided with a dedicated pin 436, 438 to enable the controller 406 to provide a controller-mode-signal to instruct the transceiver 408 to operate in a particular mode. In other respects, the node 400 may be considered to be similar to that described previously with respect to FIG. 1b.

It will be appreciated that an implementation for providing the controller-mode-signal using dedicated pins, as in the example in FIG. 4, increases external circuit complexity because of the requirement for an additional interface line between the controller 406 and the transceiver 408. In many CAN applications, the number of pins that may be implemented is limited. Indeed, for some applications, CAN transceivers have a standardised package layout which does not directly support the provision of an extra line.

The difficulties encountered by the provision of dedicated signalling pins can be overcome by instead providing the controller-mode-signal of the controller to the transceiver using the existing first-data-terminal and second-data-terminal. However, such implementations pose their own technical challenges.

Different signals can be provided by different mechanisms for the various transitions shown in FIG. 3. For example, a transition from the first mode (SLOW) to the third mode (FAST-TX) may be signaled by providing a positive pulse on the first-signal-terminal (TRXD0 (txd)), driven by CAN controller. In another example, a transition from the first mode (SLOW) to the second mode (FAST-RX) may be signalled by providing a negative pulse on the first-signal-terminal (TRXD0 (txd)) driven by CAN controller. Further mode transition conditions illustrated in FIG. 3 are discussed in further detail below, following the introduction of the concepts discussed with reference to FIGS. 4 to 10.

In the context of the CAN XL system, the specific examples discussed below with reference to FIGS. 5 to 8 are related to using the first-data-terminal and second-data-terminal to provide a controller-mode-signal that instructs the transceiver to transition from the second mode (FAST-RX) to the first mode (SLOW).

Figure 5:
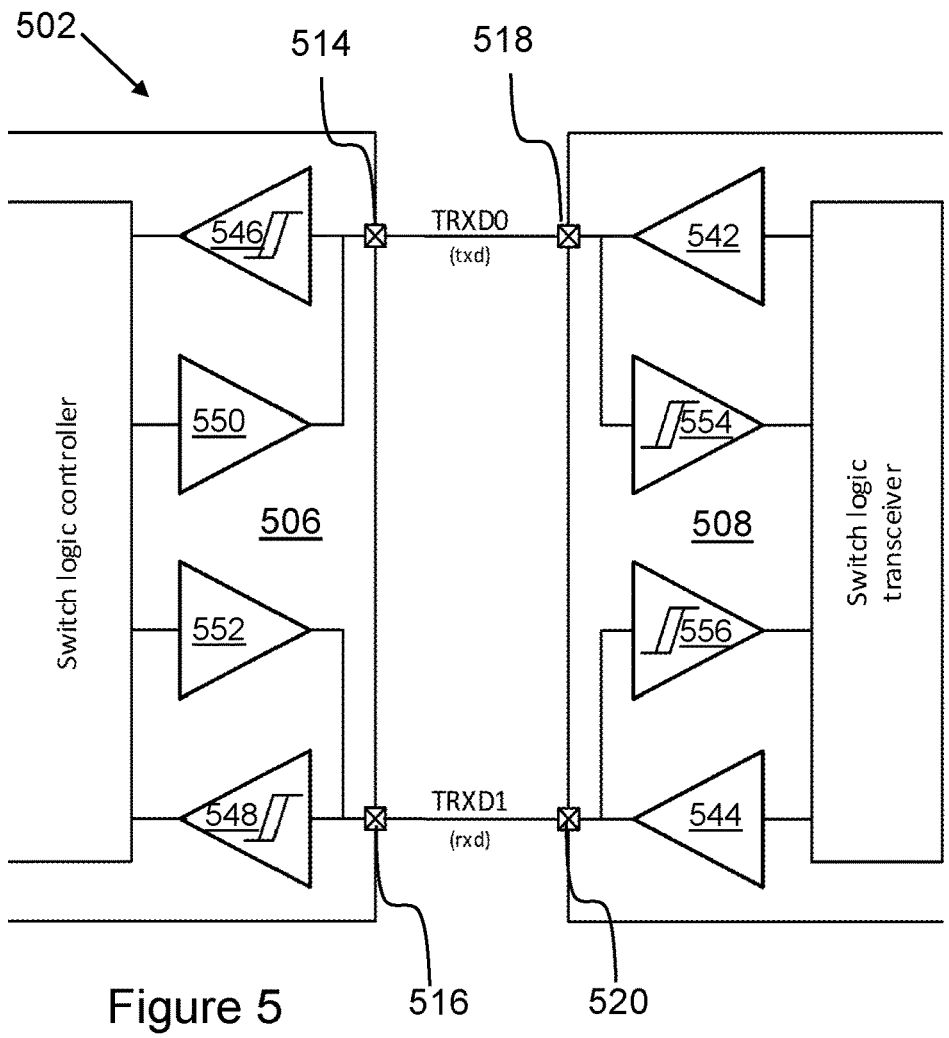
FIG. 5 illustrates a schematic block diagram for a node of a CAN XL transceiver operating in the FAST-RX mode.

FIG. 5 illustrates a schematic block diagram for a node 502 of a CAN XL transceiver operating in the second (FAST-RX) mode. The node 502 comprises a controller 506 and a transceiver 508.

The transceiver 508 comprises a first-driver 542 coupled to the first-data-terminal 518. The transceiver 508 also comprises a second driver 544 coupled to the second-data-terminal 520. In the second mode, in normal operation when data is being transmitted from the transceiver 508 to the controller 506, the transceiver 508 provides the receive-data to the controller 506 using both the first-data-terminal 518 and the second-data-terminal 520.

The first-data-terminal 518 of the transceiver 508 is coupled to the first-data-terminal 514 of the controller 506. The second-data-terminal 520 of the transceiver 508 is coupled to the second-data-terminal 516 of the controller 506.

The controller 506 comprises a first receiver stage 546 coupled to the first-data-terminal 514. The controller 506 comprises a second receiver stage 548 coupled to the second-data-terminal 516. The first receiver stage 546 and the second receiver stage 548 are provided by Schmitt triggers in this example.

Figure 6:
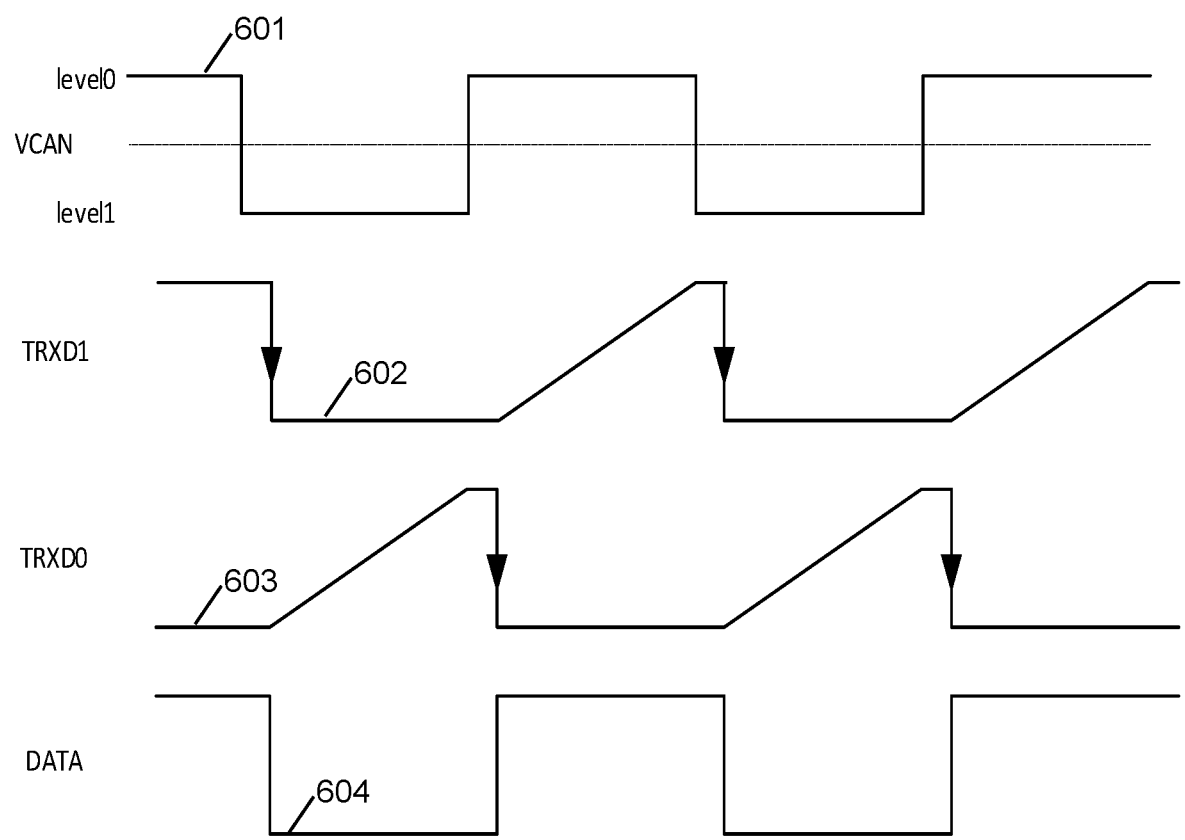
FIG. 6 illustrates a CAN bus voltage signal, corresponding signals provided at a first-data-terminal and a second-date-terminal of a CAN transceiver, and a corresponding receive-data signal obtained by a controller.

The normal operation of the node 502 may be better understood with reference to FIG. 6.

FIG. 6 illustrates a CAN bus voltage signal 601, corresponding signals 602, 603 provided at the first-data-terminal and second-date-terminal respectively, and a corresponding receive-data signal 604 obtained by the controller.

The transceiver 508 drives the signals on the first-data-terminal 518 and the second-data-terminal 520 using the first and second drivers 542, 544 out of phase with each other.

The load on the first-data-terminal and second-data-terminal is purely capacitive so a current needs to be driven to or from the respective terminals in order to increase or decrease the signal level on each terminal. That is, the output characteristics of the first- and second-data-terminals is such that they may be pulled down with a relatively high current ($I_{strong}$) and pulled up with a defined lower current ($T_{weak}$), or vis versa. The current may be driven to high or low, that is, in either direction, and the rate at which the signal level changes between the high and low levels depends on whether the current driven onto the respective terminal is weak or strong. A strong current is greater than a weak current and the terms "weak" and "strong" are used relative to one another.

In the example shown in FIG. 6, signals at the terminal are driven from high to low by the application of a strong current, whereas signals are driven from low to higher using a weak current. The strong drive current is required to meet the requirement of suitably fast transitions.

During the second (FAST-RX) mode the data from the CAN transceiver may be encoded out-phase on the first-data-terminal (TRXD0 pin) pin and encoded in-of-phase on the second-data-terminal (TRXD1 pin). Alternatively, the data may be encoded in-phase on the first-data-terminal (TRXD0 pin) pin and encoded out-of-phase on the second-data-terminal (TRXD1 pin) during the second (FAST-RX) mode. The data is decoded back in the controller by triggering on an edge of either the first-data-terminal (TRXD0 pin) or second-data-terminal (TRXD1 pin). For example, a negative edge on the first-data-terminal (TRXD0 pin) decodes into a data zero, while an negative edge on the second-data-terminal (TRXD1 pin) decodes into a data one. The positive edges have no impact on the decoding process. That is, a transition in the data may be detected based on the falling edge in the signal and the first-and-second-data terminals. In particular, a falling edge on the signal 602 at the first-data-terminal indicates a falling edge in the receive-data determined by the controller 506 and a falling edge on the signal 603 on the second-data-terminal indicates a rising edge in the receive-data determined by the controller 506. Of course, the alternative is also possible in which a positive edge triggers the data change and a negative edge is ignored. As described with reference to FIG. 1, in the second (FAST-RX) mode, the first-mode-terminal and the second-dataterminal are used as two bidirectional logic pins, in which the data is represented with an opposite logic level. Since differential encoding is used for the signals on the first-mode-terminal and the second-data-terminal in the second mode, the slope time of the rising edge on first- and second-data-terminals (TRXD0, TRXD1) is not critical for the timing symmetry.

This means that if the CAN controller needs to change to the first (SLOW) mode, the change in mode may be indicated to the transceiver by driving both first- and second-data-terminals to the low level using a strong current output driver, which is able to overcome the weak pull-up current of the transceiver resulting in a low signal. Such an indication of a change in mode is not conditional on the voltage level on the CAN bus, as may be the case with some alternative solutions.

Returning to FIG. 5, the controller 506 also comprises a first driver 550 coupled to the first-data-terminal 514 and a second driver 552 coupled to the second-data-terminal 516. The transceiver 508 comprises a first receiver stage 554 coupled to the first-data-terminal 518 and a second receiver stage 556 coupled to the second-data-terminal 520.

The controller 506 is configured to providing a controller-mode-signal that instructs the transceiver 508 to operate in the first mode rather than the second mode by driving a current on the first-data-terminal and the second-data-terminal using the first and second drivers 550, 552. The additional currents provided by the controller 506 interact with the currents applied by the first and second drivers 542, 544 of the transceiver that are related to the receive-data level. The result is that the voltage level at the first or second terminal can be altered by the controller 506 to provide a controller-mode-signal that is detectable by the receiver stages 554, 556 of the transceiver 508. The transceiver is configured to, in the second mode of operation, monitor the first-data-terminal and the second-data-terminal for the controller-mode-signal and change mode from the second mode to the first mode based on a detection of the controller-mode-signal.

The switching from the second (FAST-RX) mode to the first (SLOW) mode by driving the first- and second-data-terminals to the same logic level results in an unconditional mode change which enables predictable detection. In this way, the proposed signalling scheme may offer a robust method for providing a controller-mode-signal to the transceiver.

According to a further example of a CAN node with a CAN controller that is configured to provide a controller-mode-signal to switch a CAN transceiver from a second mode of operation into a first mode of operation—

The controller comprises a first-data-terminal for communicating with the transceiver; and a second-data-terminal for communicating with the transceiver. The controller is configured to:
 in the second mode, determine receive-data based on a signal at the first-data-terminal and the signal at the second-data-terminal;
 determine that a change of mode from the second mode to the first mode is required; and
 in response to determining that a change of mode from the second mode to the first mode is required, provide a controller-mode-signal that instructs the transceiver to operate in the first mode rather than the second mode, wherein the controller-mode-signal is provided by simultaneously driving a first current on the first-data-terminal and a second current on the second-data-terminal.

The transceiver comprises at least one bus terminal for communicating with the network bus; a first-data-terminal for communicating with the controller; a second-data-terminal for communicating with the controller; and a receiver. The first-data-terminal of the transceiver is connected to the first-data-terminal of the controller. The second-data-terminal of the transceiver is connected to the second-data-terminal of the controller. The receiver is configured to, in the second mode, generate the receive-data for the controller based on a bus signal received at the at least one bus terminal. The receive-data is provided by the transceiver driving a first current on the first-data-terminal and driving an opposing second current to the second-data-terminal. The transceiver is configured to, in the second mode of operation, monitor the first-data-terminal and the second-data-terminal for the controller-mode-signal. The controller-mode-signal is provided by the logic levels at the first-data-terminal and the second-data-terminal being the same due to the application of at least one of the first and second currents by the controller. The transceiver is further configured to change mode from the second mode to the first mode based on a detection of the controller-mode-signal.

The same method of signalling between the controller and the transceiver may be employed to provide a controller-mode-signal that provides a transition from the third (FAST-TX) mode to the first (SLOW) mode.

In such examples, the controller may be further configured to:
 in the third mode of operation, provide transmit-data using on a signal at the first-data-terminal and a signal at the second-data-terminal;
 in response to determining that a change of mode from the third mode to the first mode is required, provide a controller-mode-signal that instructs the transceiver to operate in the first mode rather than the third mode, wherein the controller-mode-signal is provided by simultaneously driving a first current on the first-data-terminal and a second current on the second-data-terminal. The transmit-data may be encoded as differential signals provided at the first-data-terminal and the second-data-terminal of the controller.

In such examples, the transceiver may further comprise a transmitter configured to, in the third mode, receive transmit-data for the controller and generate a bus signal for the at least one bus terminal based on the transmit-signal, in which the transmit-data is provided by the controller as a differential signal at the first first-data-terminal and the second-data-terminal. The transceiver is configured to:
 in the third mode of operation, monitor the first-data-terminal and the second-data-terminal for a controller-mode-signal indicating that a change of mode from the third mode to the first mode is required, in which the controller-mode-signal is provided by a logic level at the first-data-terminal being the same as a logic level at the second-data-terminal; and
 change mode from the third mode to the first mode based on a detection of the controller-mode-signal.

The operation of a controller to provide a controller-mode-signal in the second mode operation may be better understood with reference to the example described below with reference to FIGS. 7 and 8.

Figure 7:
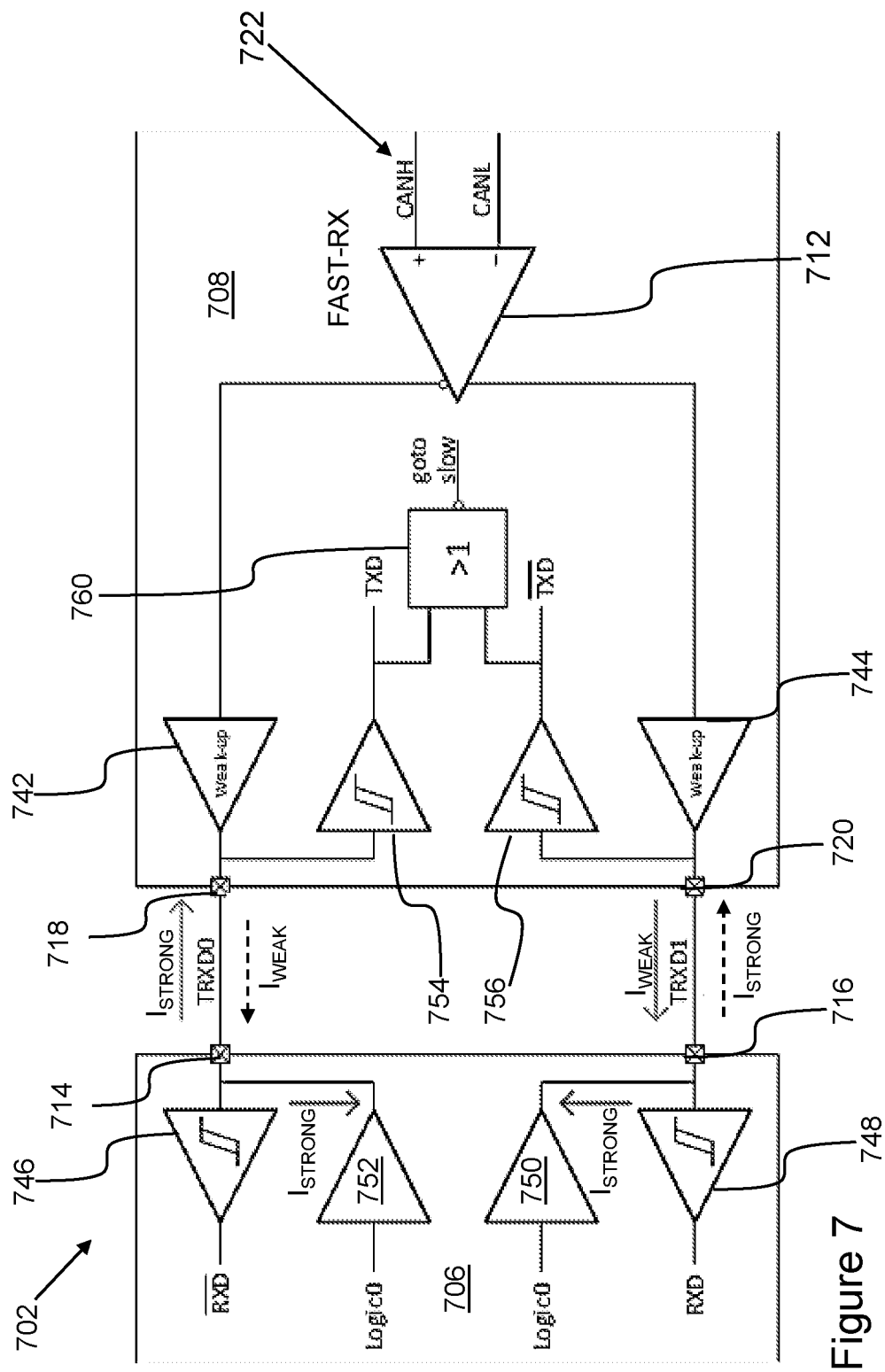
FIG. 7 illustrates a schematic block diagram of an embodiment of a node illustrating the flow of the currents between a controller and a transceiver during the FAST-RX mode.

FIG. 7 illustrates a schematic block diagram of an embodiment of a node 702 illustrating the flow of the currents between the controller 706 and the transceiver 708 during second mode operation. Corresponding reference numerals are used between the controller of FIGS. 5 and 7, and also with regards to FIG. 1b.

As illustrated previously with reference to FIG. 6, when a LEVEL1 signal, as is known in CAN terminology, is present on the CAN bus 722, the receiver 712 of the transceiver 708 controls the first driver 742 of the transceiver 708 to provide a strong sinking current to the first-data-terminal 718 and controls the second driver 744 of the transceiver 708 to provide a weak sourcing current to the second-data-terminal 720. For the avoidance of doubt, the term "sinking current" used herein means a current with the direction of current flow into the driving device, and the term "sourcing current" used herein means a current with the direction of current flow out from the driving device.

When the signal of the CAN bust is at logic LEVEL0, the receiver 712 of the transceiver 708 controls the first driver 742 of the transceiver 708 to provide a weak sourcing drive current to the first-data-terminal 718 and controls the second driver 744 of the transceiver 708 to provide a strong sinking current to the second-data-terminal 720.

In response to a determination within the controller 706 that a change in mode from the second mode to the first mode is required, the controller 706 controls the first and second drivers 750, 752 to drive a strong sinking current at the respective first-data-terminal 714 and second-data-terminal 716.

The effect of the impositions of the additional strong currents by the first and second drivers 750, 752 of the controller 706 is described further below with reference to FIG. 8.

Figure 8:
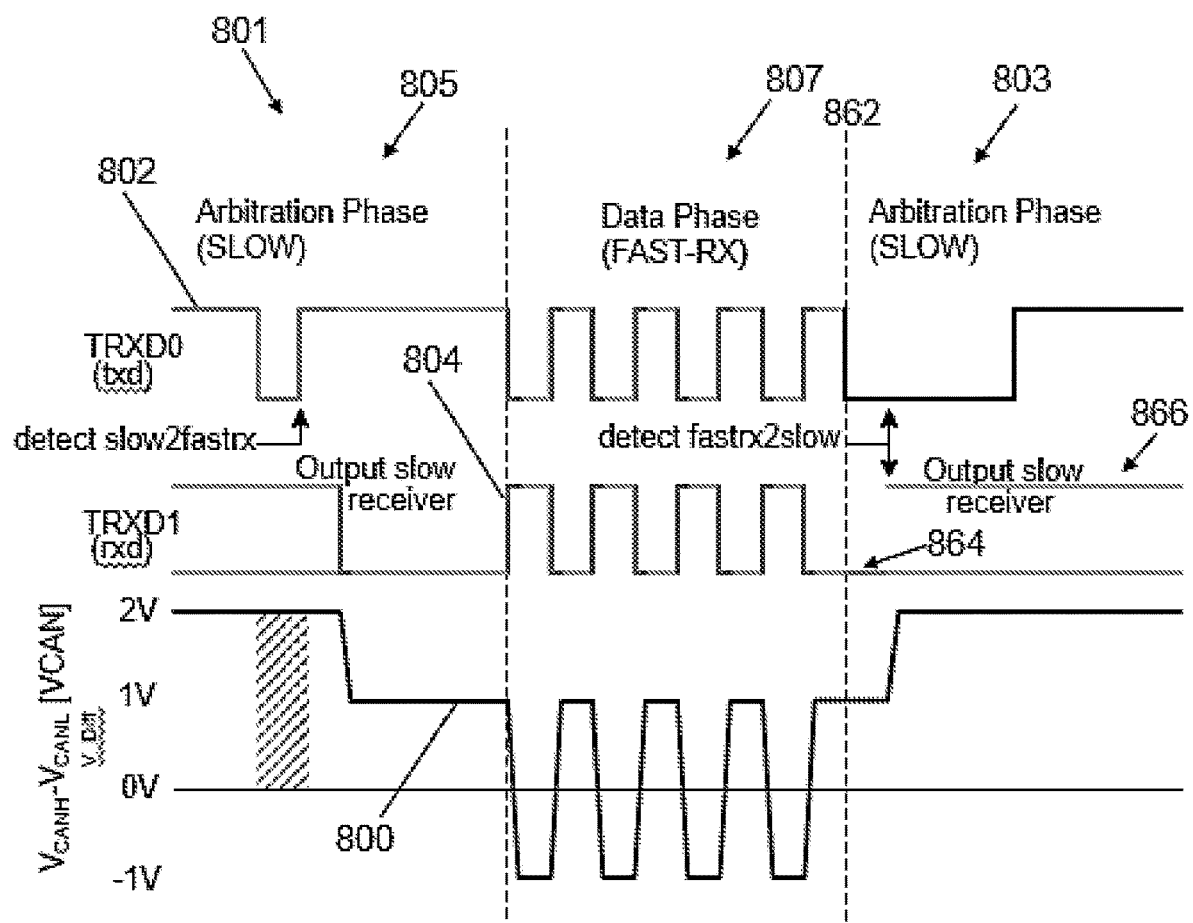
FIG. 8 illustrates a schematic of a signal on a CAN XL bus similar to that described previously with reference to FIG. 2 with corresponding differential signals at a first-data-terminal and a second-data-terminal.

FIG. 8 illustrates a schematic of a signal 800 on a CAN XL bus similar to that described previously with reference to FIG. 2 with corresponding differential signals 802, 804 at the first-data-terminal and the second-data-terminal. As described previously with reference to FIG. 2, the signal comprises exerts representing arbitration phases 803, 805 (in the first (SLOW mode) and a portion representing a data phase 807 (in the second (FAST-RX) mode).

In the first arbitration phase 805, the CAN controller transmits a single short low pulse on the first-data-terminal (TRXD0 pin), which is detected by the transceiver and then switches from the first (SLOW) mode to the second (FAST-RX) mode in the data phase 807. The second-data-terminal (TRXD1 pin) switches from output configuration in the first (SLOW) mode to input configuration in second (FAST-RX) mode. On transitioning to the data phase 807, the signal 802 at the first-data-terminal is out of phase with the signal 804 at the second-data-terminal as per the differential signalling scheme employed in the second mode of operation. On transition 862 from the data phase 807 to the arbitration phase 803, the controller drives both the first-data-terminal and the second-data-terminal so that the signals 802, 804 at the first-data-terminal and the second-data-terminal are both low simultaneously, providing an exceptional condition in the second mode. The exceptional condition is used by the controller and the transceiver as a controller-mode-signal.

The CAN controller transmits a single short negative pulse in a period 862 on both the first-data-terminal (TRXD0 pin) and the second-data-terminal (TRXD1 pin) at the same time, which is detected by the transceiver and then switches from the second (FAST-RX) mode to the first (SLOW) mode. Since the first-data-terminal (TRXD0 pin) and the second-data-terminal (TRXD1 pin) are always in opposite phase during the second (FAST-RX) mode, a short negative pulse simultaneously on both the first-data-terminal (TRXD0 pin) and the second-data-terminal (TRXD1 pin) provides an unique condition which can be detected as an indication to change mode to the first (SLOW) mode. Alternatively, the pulse may be a single short positive pulse on both the first-data-terminal (TRXD0 pin) and the second-data-terminal (TRXD1 pin) simultaneously, which is also an unique condition. In either case, the controller is configured to provide a controller-mode-signal in which voltage levels on the first-data-terminal and the second-data-terminal are in the same logic state (which may be logic high or low) by driving both the first-data-terminal and the second-data-terminal using currents of the same polarity.

The period 864 at the beginning of the arbitration phase 803 provides the controller-mode-signal in this example, before the node begins transmitting in a period 866 of the arbitration phase 803 when the level of the signal 802 at the first-data-terminal is defined by the controller and a level of the signal 804 at the second-data-terminal relates to the state of data on the CAN bus.

Returning to FIG. 7, in this example the transceiver 708 is able to monitor the signal levels at the first-data-terminal 718 and the second-data-terminal 720 using the respective first and second receiver stages 754, 756. The first and second receiver 754, 756 are provided by a Schmitt triggers in this example. The outputs from the first and second receiver stages 754, 756 are provided to an exclusive OR (XOR) gate 760. In this way, the transceiver 708 can detect when the signals at the first-data-terminal and the second-data-terminal 720 are at the same logical level, which represents an exceptional condition in the second mode operation. In this example, this exceptional condition is used to provide the controller-mode-signal indicating that a change of mode from the second mode to the first mode is required.

It will be appreciated that the controlling logic of the controller and of the transceiver may be implemented by either i) hardware or ii) hardware and software.

In some examples, the controller-mode-signal detection in the transceiver may be implemented using hardware only, for example using the XOR gate described above with reference to FIG. 8. An exclusive NOR (XNOR) operation may be performed as an alternative to an XOR operation, for example, if the signals from the first-data-terminal and the second-data-terminal are inverted.

Figure 9:
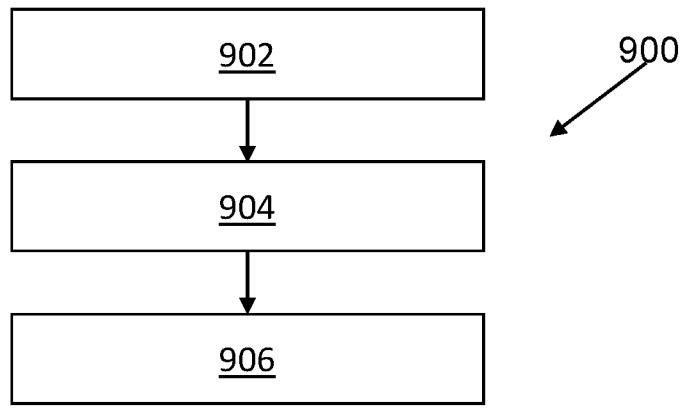
FIG. 9 illustrates a flow diagram of a method for operating a controller.

In some examples, the logic of the controller may be implemented by a data processor. FIG. 9 illustrates a flow diagram of a method 900 for operating a controller. The method 900 comprises:
in the second mode, determining 902 receive-data based on a signal at a first-data-terminal and a signal at the second-data-terminal of the controller;
determining 904 that a change of mode from the second mode to the first mode is required; and
in response to determining that a change of mode from the second mode to the first mode is required, controlling 906 drivers of the controller to drive a first current on the first-data-terminal and a second current on the second-data-terminal to provide a controller-mode-signal that instructs the transceiver to operate in the first mode rather than the second mode.

pins are only driven strong low by the CAN controller and either driven strong low or driven weak high by the transceiver the result is always low unconditional from the voltage levels on the bus.

Figure 10:
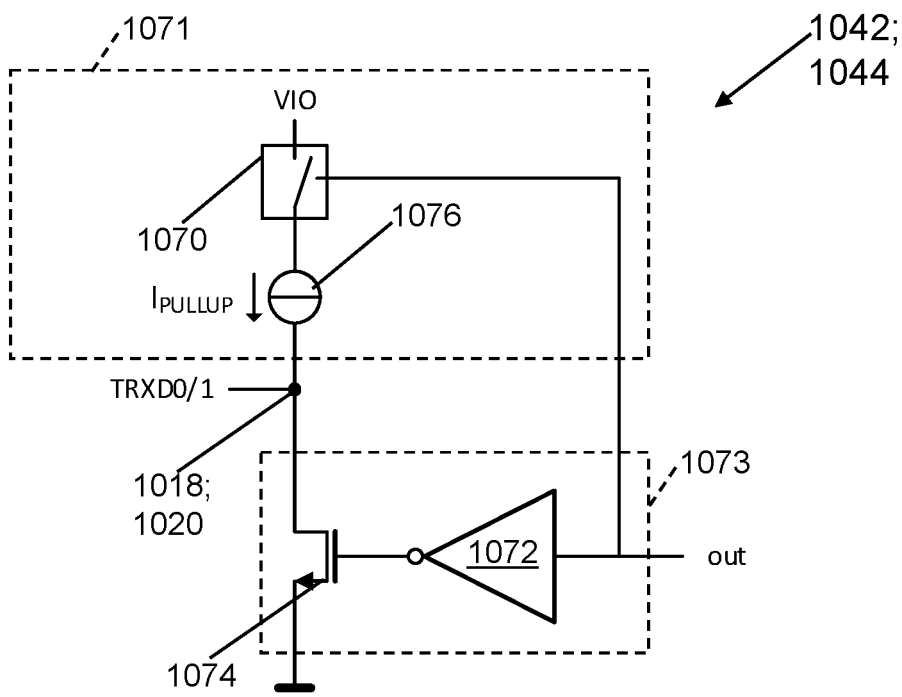
FIG. 10 illustrates a schematic diagram for an output driver of a transceiver for use in the FAST-RX mode.

FIG. 10 illustrates a schematic diagram for an output driver of a transceiver for use in the second (FAST-RX) mode. The output driver may be used in the transceiver of FIG. 7, for example.

The output driver 1042; 1044 has a strong sinking driver 1073 and a weak sourcing driver 1071. As an alternative, a strong sourcing diver and a weak sinking driver may be provided instead, depending on the chosen encoding scheme.

The strong sinking driver 1073 comprises a first switching unit 1074 and an inverter driver. In this example, the first switching unit 1074 is provided by a field effect transistor. Alternatively, the first switching unit 1074 may be provided by a bipolar transistor. An output from the receiver is provided as a switching signal to the inverter driver 1072. The output of the inverter 1072 is provided to the control input of the switching unit 1074. A conduction channel of the switching unit 1074 is coupled between a data-terminal of the transceiver and ground.

The weak sourcing driver 1071 comprises a current source ($I_{PULLUP}$) 1076 and a second switching unit 1070. The second switching unit 1074 may be provided by a bipolar transistor or a field effect transistor, for example. An output from the receiver is provided as a switching signal to the second switching unit 1070. The current source ($I_{PULLUP}$) 1076 is provided in series with a conduction path of the second switching unit 1070 between a voltage source (VIO) of the transceiver and the data-terminal 1018; 1020 of the transceiver.

The output driver configuration of the transceiver with a weak sourcing driver and strong sinking driver enables the controller to drive both the first- and second-data-terminals to the low logic level without resulting a in large short circuit current. Alternatively, a weak sinking current and a strong sourcing current as driver in the transceiver together with driving both the first- and second-data-terminals to the high logic level to signal the mode change is also a working solution. In that case, the bits of the receive-data may be encoded by rising signal edges.

An example specification for the weak pull-up current is provided below.

Assuming:
the rise period in the second mode, $t_{RISE\_FASTRX} < 50$ ns,
the power supply voltage, $V_{VIO} = 5V$,
the capacitance at the first/second-data-terminals, $C_{TRXD} < 25$ pF then
the minimum pull-up current, $I_{PULLUP\_MIN} = 25p*0.8*5/50n = 2$ mA Assume
The falling signal edge period in the second mode, $t_{FALL\_F2S} < 50$ ns,
the power supply voltage, $V_{VIO} = 5V$,
the capacitance at the first/second-data-terminals, $C_{TRXD} < 25$ pF, then the minimum current specification of output driver of the controller, $I_{GPIO\_MIN} = 10$ mA then
the maximum-pull-up current, $I_{PULLUP\_MAX} = I_{GPIO\_MIN} - 25p*0.8*5/50n = 8$ mA A specification of a current source between 2 mA and 8 mA may be easily implemented in integrated chip technology. The value of the strong currents supplied by the drivers of the controller may be higher, for example higher than 10 mA.

Returning to FIG. 3, it will be noted that a number of conditions for the various transitions 304-307 between the modes are labelled. As described previously, the modes include a first mode (SLOW) 301, a second mode (FAST-RX) 302 and a third mode (FAST-TX) 303.

A low logic level pulse provided at the first-data-terminal has a period $t_{TRXD0\_LOW}$ and a high logic level pulse provided at the first-data-terminal has a period $t_{TRXD0\_HIGH}$.

Similarly, a low logic level pulse provided at the first-data-terminal has a period $t_{TRXD0\_LOW}$ and a high logic level pulse provided at the first-data-terminal has a period $t_{TRXD0\_HIGH}$.

In this example, the node may transition 306 from the first mode 301 to the second mode 302 if:

$t_{TOFAST\_MIN} < t_{TRXD0\_LOW} < t_{TOFAST\_MAX}$.

That is, a low pulse at the first-signal terminal acts as a controller-mode-signal if it is of a duration between a minimum transition period $t_{TOFAST\_MIN}$ and a maximum transition period $t_{TOFAST\_MAX}$. The minimum transition period $t_{TOFAST\_MIN}$ is used as a threshold to prevent a mode change based on a very small glitch on the first-data-terminal (TRXD0 pin). The maximum transition period $t_{TOFAST\_MAX}$ is used as a threshold to prevent a mode change based on normal CAN FD.

The node may transition 304 from the first mode 301 to the third mode 303 if:

$t_{TOFAST\_MIN} < t_{TRXD0\_HIGH} < t_{TOFAST\_MAX}$.

The node may transition 307 from the second mode 302 to the first mode 301 if:

$t_{TRXD0\_LOW} > t_{TOSLOW}$; and
$t_{TRXD1\_LOW} > t_{TOSLOW}$, in which is a threshold for recognizing a pulse.

The node may transition 305 from the third mode 303 to the first mode 301 if:

$t_{TRXD0\_LOW} > t_{TOSLOW}$; and
$t_{TRXD1\_LOW} > t_{TOSLOW}$.

An example for the pulse length specification is:

$t_{TOFAST} < t_{CANFD\_MAX}$;
Max CANFD 8 Mbps: $t_{TOFAST} < 125$ ns;
90 ns $< t_{TOFAST} < 110$ ns;
$t_{TOSLOW} < (t_{ARBMIN}/2 - t_{FALL\_F2S})$;
Max ARB 1 Mbps;
$t_{ARBMIN}$ 1 µs;
$t_{FALL\_F2S} < 50$ ns;
$t_{TOSLOW} < 450$ ns;
90 ns $< t_{TOSLOW} < 110$ ns.

One way for the controller to generate the short TXD pulses used as the controller-mode-signal is to use the existing time quanta mechanism of the controller. That is, the bit is divided in separate time slots (time quanta), and is used by the CAN controller to define specific protocol aspects like re-synchronization regions and a sample point. These time quanta can also be used to generate a defined short pulse.

Figure 11:
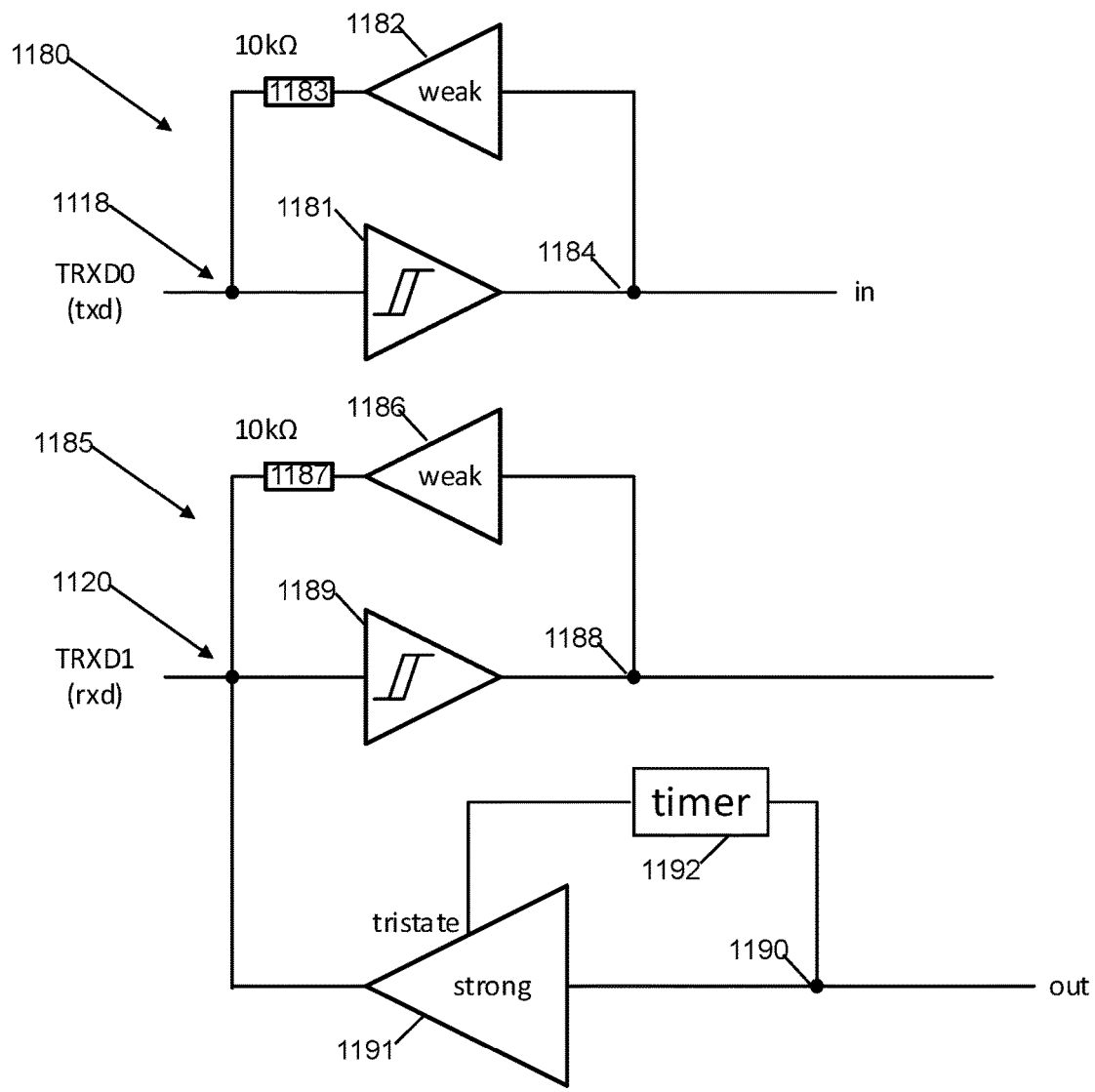
FIG. 11 illustrates additional circuitry for use in a SLOW mode of operation.
Figure 12:
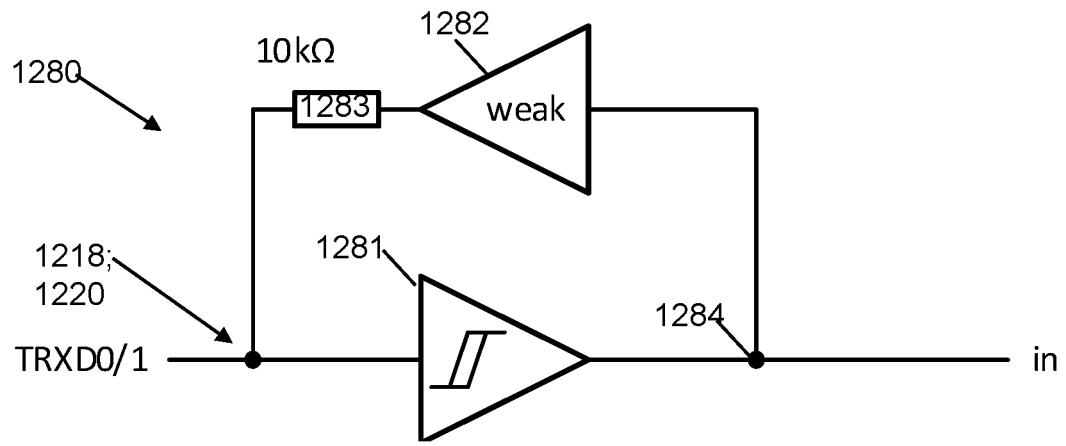
FIG. 12 illustrates a schematic block diagram of a repeater unit provided at each of a first-data-terminal and a second-data-terminal for use in a FAST-TX mode.
Figure 13:
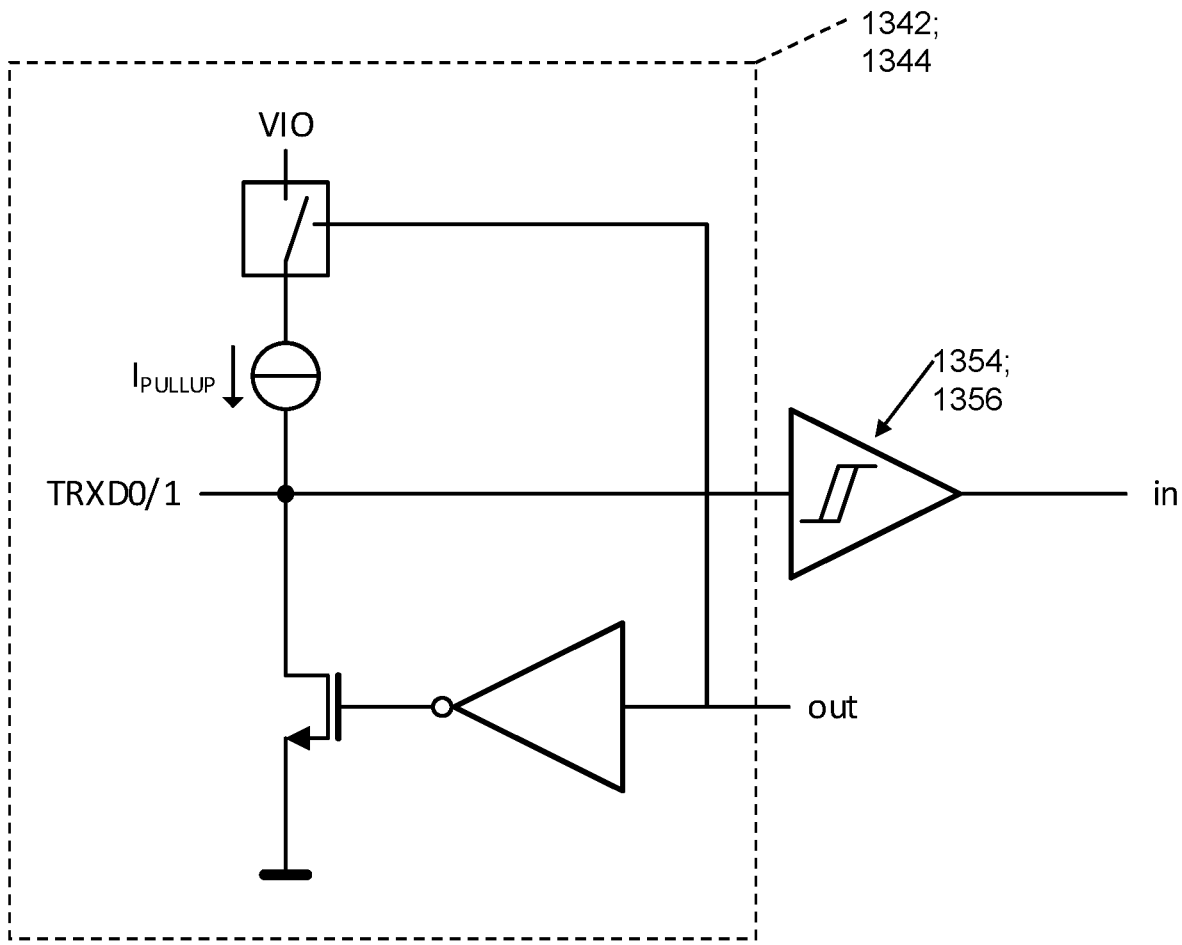
FIG. 13 illustrates a schematic block diagram of a unit provided at each of a first-data-terminal and a second-data-terminal for use in the FAST-RX mode.

FIGS. 11 to 13 illustrate additional circuitry that can be provided in a transceiver at the first-data-terminal and the second-data-terminal for use in the various modes of operation.

FIG. 11 illustrates additional circuitry for use in the first (SLOW) mode of operation. In the first mode, the transmitter of the transceiver converts data received at the first-data-terminal to a differential signal for the CAN bus.

A first-data-terminal repeater unit 1180 is provided at the first-data-terminal 1118 for use in the first mode. The repeater unit 1180 comprises:
- a forward path receiver 1181, provided by a Schmitt trigger, between the first-data-terminal 1118 and an input 1184 of the transmitter; and
- a feedback path comprising a series arrangement of a weak current driver 1182 followed by an impedance 1183 (a 10 kOhm resistor in this example) from the input 1184 of the transmitter to the first-data-terminal 1118.

A second-data-terminal repeater unit 1185 is also is provided at the second-data-terminal 1120 for use in the first mode. The second-data-terminal repeater unit 1185 comprises:

- a forward path receiver 1189, provided by a Schmitt trigger, between the second-data-terminal 1120 and an input 1188 of the receiver; and
- a feedback path comprising a series arrangement of a weak current driver 1186 followed by an impedance 1187 (a 10 kOhm resistor in this example) from the input 1188 of the receiver to the second-data-terminal 1120.

The first-data-terminal (TRXD0) of the transceiver in the first (SLOW) mode is an input pin. A repeater configuration prevents undefined levels in case of failure modes when the CAN controller is in a wrong mode and also has its first-data-terminal (TRXD0 pin) as input and neither the controller nor the transceiver is driving the pin. The impedance acts as a high-ohmic pull-up or pull-down, depending on the previous received logic level. When the pin becomes floating it will keep the last known logic state.

An output driver 1191 of the receiver is coupled to the second-data-terminal 1120. The output driver is configured to provide a strong output current when enabled. The output driver having a maximum active pulse time provided by a fixed timer 1192. In this way, the second-data-terminal repeater unit 1185 provides a driver which drives the output for a fixed time triggered by a change on its input and after the fixed time elapses the output is in high ohmic, tristate.

The second data-terminal (TXRD1) 1120 of the transceiver in the first (SLOW) mode in an output pin and an input (repeater) pin. The output driver 1191 is in a tristate condition during a static state and the logic level at the second-data-terminal (TXRD1) 1120 is defined by the repeater via the impedance, which is provided by a pull-up/down resistor. In case the output driver 1191 is driving a current to change the output level at the second-data-terminal (TXRD1) 1120, the strong driver is only active for a fixed period defined by the fixed timer 1192, which is triggered by both rising and falling edge (on net "out"). The provision of the fixed timer on the driver prevents long short currents in case of a failure mode when the CAN controller is in a wrong mode and is also driving the second-data-terminal (TRXD1 pin).

A duration of the period of the fixed timer may depend on the current driver strength and the capacitive load present on the second-data-terminal. A minimum value for the fixed time may be larger than the maximum slope time. For example:

Assuming,
the minimum driver strength is 10 mA,
the supply voltage is 5V,
the capacitive load is 25 pF then
the maximum slope time is 25p*5/10 m=12.5 ns
therefore
the minimum period for the time is greater than 12.5 ns FIG. 12 illustrates a schematic block diagram of a repeater unit 1280 provided at each of the first-data-terminal 1218 and the second-data-terminal 1220 for use in the third (FAST-TX) mode. That is, both first- and second-data-terminals (TRXD0/1 pins) are in repeater mode during the third (FAST-TX) mode. Each repeater unit 1280 comprises:

- a forward path receiver 1281, provided by a Schmitt trigger, between the first-data-terminal 1218 or second-data-terminal and an input 1284 of the transmitter; and
- a feedback path comprising a series arrangement of a weak current driver 1282 followed by an impedance 1283 (a 10 kOhm resistor in this example) from the input 1284 of the transmitter to the first-data-terminal 1218 or the second-data-terminal.

FIG. 13 illustrates a schematic block diagram of a unit 1380 provided at each of the first-data-terminal 1318 and the second-data-terminal 1320 for use in the second (FAST-RX) mode. The unit 1380 comprises driver stage 1342; 1344 and receiver stage 1354; 1356.

The driver stage 1342; 1344 and receiver stage 1354; 1356 correspond to the driver stage and receiver stage provided at either of the first-data-terminal and the second-data-terminal described previously with reference to FIG. 7.

The receiver stage 1354; 1356 is provided by a Schmitt trigger in this example. Alternatively, the Schmitt trigger may be replaced with a repeater arrangement such as that described previously with reference to FIG. 12.

The internal configuration of the driver stage 1342; 1344 is the same as that described previously with reference to FIG. 10.

In the second (FAST-RX) mode, both the first-data-terminal 1318 and the second-data-terminal 1320 (TRXD0/1 pins) are both used as outputs for the transceiver and the receiver stage allows the transceiver to detect a controller-mode-signal.

It will be appreciated that the circuitry described with reference to FIGS. 11 to 13 may be provided in combination with a transceiver such as that described with reference to FIGS. 5 and 7. Alternatively, the circuitry described with reference to FIGS. 11 to 13 may be provided in combination with a CAN transceiver, including CAN FD transceivers.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services.

These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A controller for communicating with a transceiver in a network node having a first mode of operation and a second mode of operation, the controller comprising:
   a first-data-terminal for communicating with the transceiver; and
   a second-data-terminal for communicating with the transceiver,
   in which the controller is configured to:
      during a first arbitration phase, generate a first controller-mode-signal that causes the transceiver to operate in the second mode, by simultaneously driving a first current on the first-data-terminal and a second current on the second-data-terminal, wherein the first current and the second current have opposite polarity;
      during a data transmission phase that occurs after the first arbitration phase, transmitting data to the transceiver using a differential signal encoding scheme in which a data value is signaled by a voltage difference between a first voltage on the first-data-terminal and a second voltage on the second-data-terminal; and
      during a second arbitration phase that occurs after the data transmission phase:
         determine that a change of mode from the second mode of operation to the first mode of operation is required, wherein the first mode of operation involves transmitting the data to the transceiver using the first-data-terminal or the second-data-terminal; and
         generate a second controller-mode-signal that causes instructs the transceiver to operate in the first mode rather than the second mode, by, during the second arbitration phase, simultaneously driving a first current on the first-data-terminal and a second current on the second-data-terminal, wherein the first current and the second current have the same polarity.

2. The controller of claim 1, further configured to provide the second controller-mode-signal by driving both the first-data-terminal and the second-data-terminal into the same logic state.

3. The controller of claim 2, further configured to provide the second controller-mode-signal by driving both the first-data-terminal and the second-data-terminal into a low logic state.

4. The controller of claim 3, further comprising a first strong sinking driver for driving the first current at the first-data-terminal and a second strong sinking driver for driving the second current at the second-data-terminal.

5. The controller of claim 1, further configured to:
   in a third mode of operation, provide transmit-data using on a first signal at the first-data-terminal and a second signal at the second-data-terminal; and
   in response to determining that a second change of mode from the third mode to the first mode is required, provide a third controller-mode-signal that instructs the transceiver to operate in the first mode rather than the third mode, wherein the third controller-mode-signal is provided by simultaneously driving a third current on the first-data-terminal and a fourth current on the second-data-terminal.

6. The controller of claim 1, in which the controller is a CAN controller.

7. A transceiver for communicating with a controller in a network node and a network bus having a first mode of operation and a second mode of operation, the transceiver comprising:
   at least one bus terminal for communicating with the network bus;
   a first-data-terminal for communicating with the controller;
   a second-data-terminal for communicating with the controller,
   a receiver configured to, in the second mode and during a first data transmission phase, generate receive-data for the controller based on a bus signal received at the at least one bus terminal, by determining a differential value generated by the transceiver driving a first current on the first-data-terminal and driving an opposing second current to the second-data-terminal;
   in which the transceiver is configured to:
      during an arbitration phase that occurs after the first data transmission phase, monitor the first-data-terminal and the second-data-terminal for a controller-mode-signal indicating that a change of mode from the second mode to the first mode is required, in which the controller-mode-signal is provided by a logic level at the first-data-terminal being the same as a logic level at the second-data-terminal for a period of time that exceeds a minimum duration for detecting a signal pulse in the second mode; and
      change mode from the second mode to the first mode based on a detection of the controller-mode-signal to cause the receiver to operate in the first mode during a second data transmission phase that occurs after the arbitration phase, wherein the receiver generates receive-data for the controller based on a bus signal received at the at least one bus terminal, by determining a logic level at either the first-data-terminal or the second-data-terminal.

8. The transceiver of claim 7, in which one of the first and second currents is configured to drive a voltage level towards logic low and the other of the first and second currents drives the voltage level towards logic high.

9. The transceiver of claim 7, in which the receiver is configured to control a first output driver to provide the first current and to control a second output driver to provide the second current in accordance with the bus signal.

10. The transceiver of claim 7, comprising a first output driver coupled to the first-data-terminal of the transceiver and a second output driver coupled to the second-data-terminal of the transceiver, wherein each output driver comprises a weak sourcing driver and a strong sinking driver for providing the respective first and second currents.

11. The transceiver of claim 7, further comprising logic configured to perform an exclusive OR, XOR, or exclusive NOR, XNOR, operation on signals from the first-data-terminal and the second-data-terminal.

12. The transceiver of claim 7, further comprising:
a transmitter configured to, in a third mode, receive transmit-data for the controller and generate a bus signal for the at least one bus terminal based on the transmit-signal, in which the transmit-data is provided by the controller as a differential signal at the first first-data-terminal and the second-data-terminal;
in which the transceiver is configured to:
in the third mode of operation, monitor the first-data-terminal and the second-data-terminal for a second controller-mode-signal indicating that a change of mode from the third mode to the first mode is required, in which the second controller-mode-signal is provided by a logic level at the first-data-terminal being the same as a logic level at the second-data-terminal; and
change mode from the third mode to the first mode based on a detection of the second controller-mode-signal.

13. The transceiver of claim 7, further comprising:
a transmitter having an input coupled to the first-data-terminal and at least one output connected to a CAN bus terminal, in which the transmitter is configured to, in the first mode, convert data received at the first-data-terminal to a differential signal for the CAN bus;
a first-data-terminal repeater unit for use in the first mode, the repeater unit comprising:
a forward path buffer between the first-data-terminal and the transmitter; and
a feedback path between the first-data-terminal and the transmitter;
a second-data-terminal repeater unit for use in the first mode, the second-data-terminal repeater unit comprising:
a forward path buffer between the second-data-terminal and the receiver; and
a feedback path between the second-data-terminal and the receiver,
in which the receiver comprising an output driver coupled to the second-data-terminal, the output driver having a maximum active pulse time.

14. The transceiver of claim 13, in which the output driver is configured to be in high ohmic state after the maximum active pulse time has elapsed.

15. The transceiver of claim 7 having a third mode of operation and further comprising:
a transmitter configured to, in the third mode, convert data received at the first-data-terminal to a differential signal for the CAN bus using a different conversion scheme to conversion in the first mode;
a first-data-terminal repeater unit for use in the third mode, the first-data-terminal repeater unit comprising:
a forward path buffer between the first-data-terminal and the transmitter, and
a feedback path between the first-data-terminal and the transmitter; and
a second-data-terminal repeater unit for use in the third mode, the second-data-terminal repeater unit comprising:
a forward path buffer between the second-data-terminal and the receiver, and
a feedback path between the second-data-terminal and the receiver.

16. The transceiver of claim 7, wherein the transceiver is a CAN transceiver.

17. A non-transitory computer readable medium comprising computer program code configured to cause a processor to perform a method of operating a controller communicating with a transceiver in a network node having a first mode of operation and a second mode of operation, the method comprising:
in the second mode and during a first data transmission phase, determining receive-data based on a differential value between a signal at a first-data-terminal and a signal at the second-data-terminal of the controller;
during an arbitration phase that occurs after the first data transmission phase, determining that a change of mode from the second mode to the first mode is required;
in response to determining that a change of mode from the second mode to the first mode is required, controlling drivers of the controller to drive a first current on the first-data-terminal and a second current on the second-data-terminal to set a first logic level of the first-data-terminal equal to a second logic level of the second-data-terminal for a period of time that exceeds a minimum duration for detecting a signal pulse in the second mode to provide a controller-mode-signal that instructs the transceiver to operate in the first mode rather than the second mode; and
in the first mode and during a second data transmission phase that occurs after the arbitration phase, determining receive-data based on a logic level at either the first-data-terminal or the second-data-terminal.

* * * * *